Dec. 19, 1961   E. V. HARPER   3,013,532
DECELERATION VALVE
Filed April 1, 1960   2 Sheets-Sheet 1
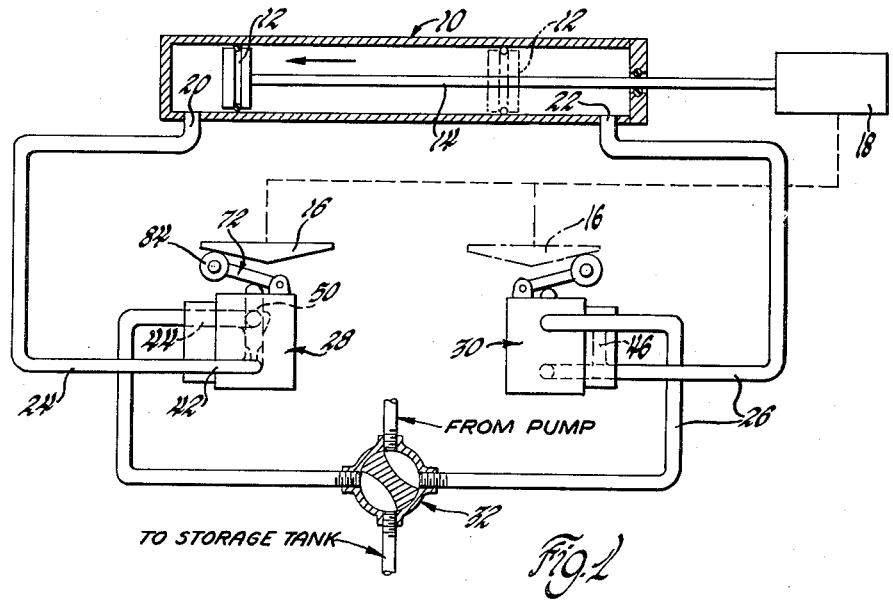
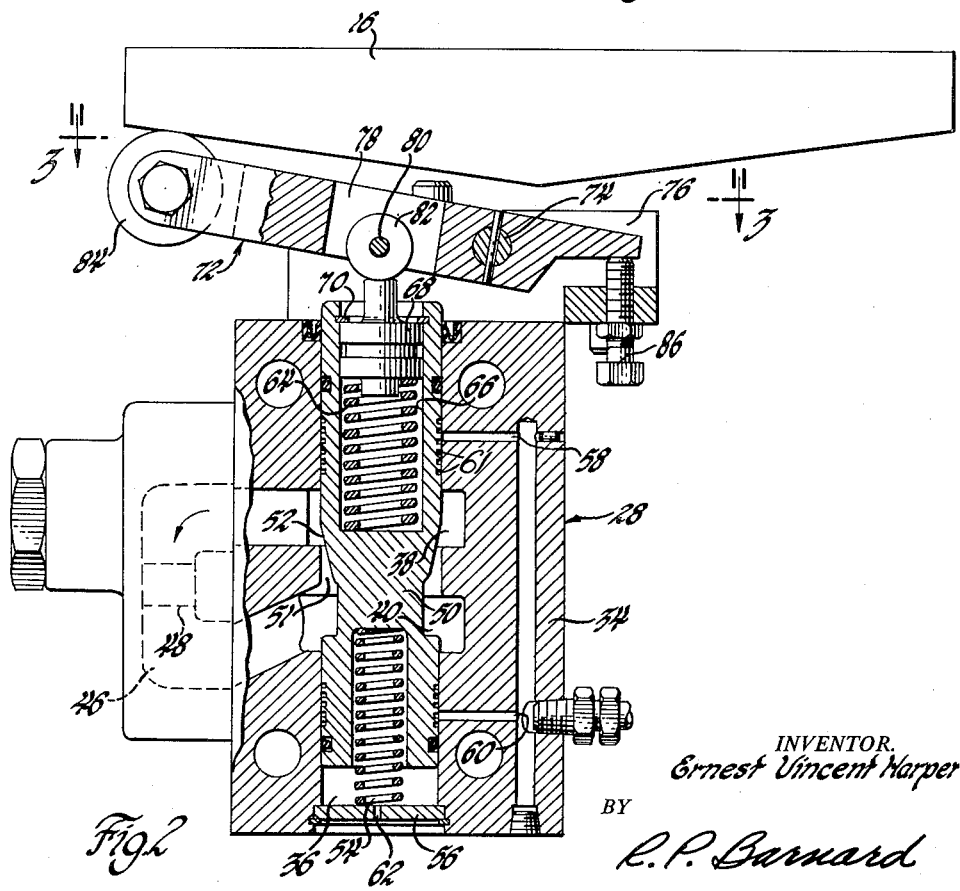
INVENTOR.
Ernest Vincent Harper
BY
R. P. Barnard
ATTORNEY Dec. 19, 1961 E. V. HARPER 3,013,532
DECELERATION VALVE
Filed April 1, 1960 2 Sheets-Sheet 2
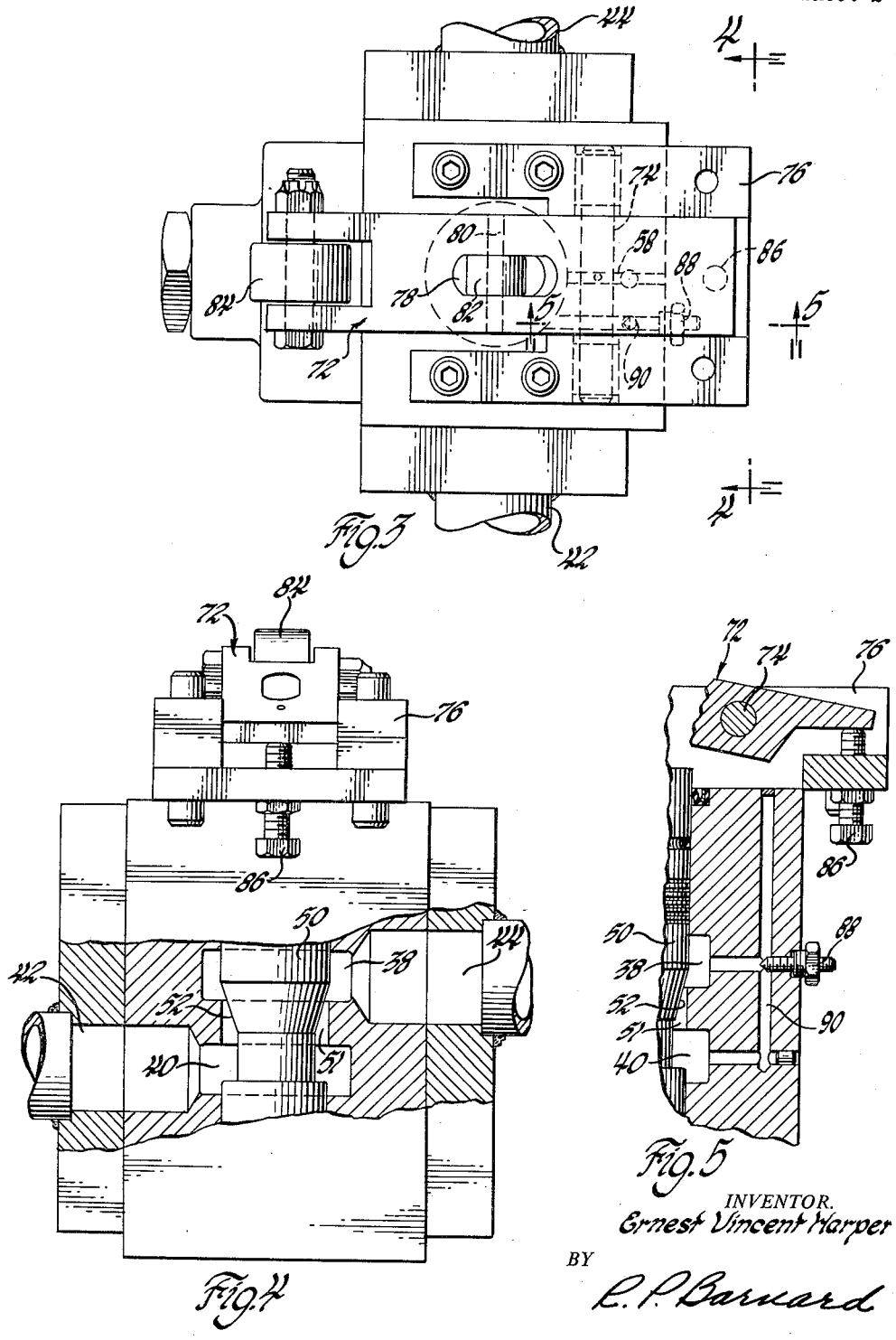
INVENTOR.
Ernest Vincent Harper
BY
C. P. Barnard
ATTORNEY

United States Patent Office 3,013,532
Patented Dec. 19, 1961

3,013,532
DECELERATION VALVE
Ernest V. Harper, Utica, Mich., assignor to General Motors Corporation, Detroit, Mich., a corporation of Delaware
Filed Apr. 1, 1960, Ser. No. 19,221
7 Claims. (Cl. 121—38)

This invention relates to deceleration control apparatus for material conveyor mechanisms and more particularly to means for gradually decelerating a conveyor mechanism driven by a fluid actuated motor.

It is common practice to provide fluid pressure actuated motors with means for cushioning or decelerating the motor drive mechanism as a particular motor movement is completed. The provision of cushioning or decelerating means is especially critical in applications where such motors are used to move heavy masses at high rates of speed between work stations. For example, fluid motor driven shuttles are used with heavy-duty presses to position steel blanks weighing hundreds of pounds at relatively high rates of speed over relatively short distances. It may be readily comprehended that deceleration of large, fast moving loads of this type must be closely controlled to avoid severe damage to the shuttle mechanism. A particular problem of previous deceleration means has been the lack of adequate control of pressure surges in the fluid pressure actuated motors which cause uneven deceleration and failure of the shuttle components as well as resulting in improper positioning of the parts being moved. Elimination of the effects of pressure surges is difficult because the shuttle mechanisms are commonly used to position parts of variable mass at variable velocities through variable distances.

Accordingly, an object of this invention is to provide improved fluid pressure motor actuated shuttle control mechanism that is simple and rugged in construction, positive and reliable in operation, and inexpensive to manufacture. Another object of this invention is to utilize the fluid displaced by a piston associated with a fluid pressure actuated motor to control the speed of movement of an associated conveyor mechanism. A further object of my invention is to retard or otherwise control piston movement of a fluid pressure actuated motor at the end of a load moving stroke by throttling the discharge of fluid pressure displaced by the piston. Still another object of this invention is to provide a new and improved cushioning valve that is mechanically actuable by conveyor mechanism with which it is associated. Still another object of this invention is to provide a shuttle deceleration valve which eliminates the adverse effects of pressure surges in the fluid system.

Other objects and advantages of the present invention are disclosed in the following detailed description and the illustrative embodiment of the invention shown on the accompanying drawing wherein:

FIGURE 1 is a diagrammatic side elevation partly in section of the deceleration control means as applied to the fluid pressure actuated motor;

FIGURE 2 is an enlarged view with parts broken away and in section of one of the deceleration valves shown in FIGURE 1;

FIGURE 3 is a top view taken along the line 3—3 in FIGURE 2;

FIGURE 4 is an end view, partly in section, taken along the line 4—4 in FIGURE 3; and FIGURE 5 is a partial sectional view taken along the line 5—5 in FIGURE 3.

Referring now to the drawing, the reference numeral 10 designates a double acting, reciprocating type fluid pressure actuated motor having a piston 12 and a piston rod 14 that is drivingly connected to a conveyor mechanism or shuttle (not shown). A shuttle cam 16 is mechanically linked to the shuttle 18 for a purpose to be hereinafter described. The motor cylinder is conventionally provided with fluid ports 20, 22 at each end thereof. Passages or conduits 24, 26 alternately connect the ports 20, 22 through deceleration valves 28, 30 and a conventional four-way valve 32 to a storage tank or fluid pump (not shown).

Each of the deceleration valves 28, 30 are identical and therefore only the valve 28 as shown in FIGURES 2–5 is described in detail. The valve comprises a body portion 34 having a central bore 36 and spaced annular chambers 38, 40 concentric therewith. Fluid traveling in the conduit 24 is carried through the valve by the transverse passages 42, 44 that open in the annular chambers 38, 40, respectively. In addition, the annular chambers are connected by a passage 46 which contains a one-way check valve 48 permitting flow from the pump side of the valve only to by-pass the central valve passage. A valve spool 50 is slidably mounted in the central bore 36 and has a central tapered portion 52 of reduced cross section to provide a variably restricted passage 51 between the annular chambers 38, 40. The valve spool is of the differential type whereby a greater surface area on the upper portion of the valve spool is exposed to fluid pressure in the chamber 40 than the surface area exposed to fluid pressure on the lower end of the valve spool to tend to keep the passage 51 open. A compression spring 54 is seated in a spring cavity between the lower end of the valve spool and a cover plate 56 secured in the lower end of the central bore 36. The bias of the spring 54 normally positions the valve spool upwardly to provide a fluid passage between the annular chambers 38, 40. Drain passages 58, 60 are provided in the body portion 34 to convey fluid leakage past balance grooves 61 provided on the spool 50 from the central bore 36 to a tank. It is to be noted that the spool cavity is vented to the atmosphere through a vent 62 provided in the cover plate 56 to insure freedom of spool action. A pressure relief spring 64 is seated in a spring cavity 66 provided on the upper end of the valve spool 50 and is engaged with a control button 68 that is slidably retained within the spring cavity 66 by a snap ring 70 or other suitable device. A control lever 72 is pivotally supported adjacent the top of the valve member on a pin 74 fixed to a bracket 76 fastened to the valve 28. A centrally located slot 78 is provided on the control lever 72 and a pin 80 supports a roller member 82 that is engageable with the top of the control button 68. One end of the control lever is bifurcated and provided with a cam engaging roller 84 and the other end of the lever abuts an adjusting screw 86 which limits movement of the control lever 72. The adjusting screw 86 provides a shuttle speed control since upward adjustment of the screw depresses the valve spool to restrict oil flow between the annular chambers 38, 40. The particular roller and lever assembly described protects the valve spool from side thrust loads caused by the deceleration cam 16. A creep-speed adjusting screw 88 is positioned in a passage 90 to control flow between the annular chambers 38, 40 when the valve spool 50 closes the passage 51.

With the piston moving in the direction of the arrow as shown in FIGURE 1 and the four-way relief valve in the position indicated whereby high pressure fluid is being supplied to the fluid port 22 through the conduit 26 and fluid is being exhausted from the port 20 through the conduit 24. High pressure fluid in the conduit 26 passes through the one-way check valve 48 of the deceleration valve 30 to the cylinder port 22. Exhaust fluid passes through the deceleration valve 28 by spring and fluid pressure actuation of the valve spool 50 upwardly to open the passage 51 between the annular chambers 38, 40. As the conveyor mechanism actuated by the fluid motor 10 approaches the end of a load positioning stroke the shuttle cam 16 engages the roller 84 and the control lever 72 is gradually rotated downwardly about its pivotal connection. The valve spool is thus forced downwardly to gradually close the passage 51 and ultimately prevent fluid passage between the annular chambers 38, 40. The pressure relief spring 64 is designed to withstand a specific hydraulic pressure which is determined to best promote smooth, uniform deceleration. When the pressure of the discharge fluid exceeds the predetermined pressure, the valve spool is shifted upwardly against the bias of the pressure relief spring 64 to prevent excessive pressure build-up in the motor. In this manner high pressure surges in the motor are accommodated by momentarily counteracting the downward movement of the valve spool and shifting the valve spool upwardly to permit fluid surges to pass between the annular chambers 38, 40 without undesirable pressure build-ups in the fluid motor. Thus, the control lever 72 is moved downwardly by the shuttle cam 16 to depress or close the normally open valve spool 50 and restrict the flow of oil to the storage tank and decelerate the shuttle. If, during deceleration, fluid pressure increases above the predetermined pressure resistance of the preloaded spring 64, the valve spool will be forced upwardly to open the passage 51 and the fluid motor pressure will be maintained at a preset rate. The creep-speed adjusting screw 88 is provided to permit the motor to complete each stroke at a predetermined velocity by permitting further exhausting of fluid after the valve spool 50 has closed the exhaust passage 51. As a result of the valve operation uneven shuttle deceleration causing failure of hydraulic and shuttle components as well as improper positioning of the parts being moved is prevented.

It is recognized that the arrangement of the features above described provide a system of operating and controlling reciprocating motion which may be carried out by either the device as above illustrated or a similar one which may be different in certain respects without departing from the scope of the following claims.

What is claimed is:

1. In combination, a cylinder, a piston reciprocable therein, a port at each end of the cylinder, a reversing valve connected to a source of fluid under pressure, connections between each port and said valve, a discharge connection from the valve to a fluid reservoir, and a hydraulic valve interposed between each port and the reversing valve, said hydraulic valve having a valve member movable in response to the position of said piston to reduce fluid discharge flow through said valve, and pressure relief means associated with said valve member to oppositely movably position said valve member to maintain a predetermined cylinder pressure.

2. In a reciprocating type fluid pressure actuated mechanism, a power cylinder drivingly associated therewith, a valve member having a central fluid passage, a first port in said fluid passage adapted to be selectively connected with a source of fluid pressure and with exhaust, a second port in said fluid passage adjacent to but spaced from said first port of said valve member and in communication with one end of said power cylinder, a valve piston reciprocably supported in said valve member to open and close the portion of the central fluid passage between said first port and said second port, means associated with said valve piston to close the portion of the central fluid passage between said first port and said second port in response to the stroke position of said mechanism when said first port is connected to exhaust, and means responsive to pressure surges in said power cylinder to momentarily open the portion of the central fluid passage between said first port and said second port and relieve said pressure surges.

3. Conveyor deceleration apparatus associated with a conveyor actuating fluid motor, a fluid system to direct high pressure fluid to said fluid motor and to direct exhaust fluid to a reservoir, exhaust fluid control means to restrict exhaust fluid flow from said fluid motor and cause gradual deceleration of said fluid motor at the end of a conveyor moving stroke thereof, and means associated with said exhaust fluid control means to momentarily retard the deceleration of said fluid motor in response to pressure surges in said fluid system.

4. A conveyor deceleration valve in a fluid system for directing high pressure fluid to a conveyor actuating fluid motor and for directing exhaust fluid therefrom to a reservoir, and comprising: a valve body having a central spool bore, spaced chambers intersecting said central bore, fluid ports connecting each of said chambers to said fluid system so that in relation to exhaust fluid being expelled from said fluid motor one of said chambers is an inlet and the other of said chambers is an outlet, a valve spool slidably supported in fluid flow restricting surface engagement within said central bore, a portion of said valve spool being reduced in cross section and having an outwardly tapered surface forming a variable flow restriction between said chambers, a flow passage between said chambers defined by said central bore and said portion of said valve spool, spring cavities formed on each end of said valve spool, a spool valve actuating flow passage opening spring means seated in one of said spring cavities, pressure relief spring means seated in the other of said spring cavities, slide means associated with said pressure relief spring in said other spring cavity and being slidable relative to said valve spool, valve spool actuating flow passage closing means operatively connected to said valve spool through said slide means and said pressure relief spring, said valve spool actuating flow passage closing means being responsive to the stroke position of said fluid motor to gradually force said valve spool to a flow passage closing position against the bias of said flow passage opening spring to decelerate said fluid motor at the end of a conveyor positioning stroke, and said pressure relief spring being compressible in response to predetermined excessive fluid pressure in said fluid system to slide said valve spool relative to said slide means to a flow passage opening position.

5. The deceleration valve as defined in claim 4 and having atmospheric venting means provided at both ends of said valve spool.

6. The deceleration valve as defined in claim 4 and wherein said valve spool actuating flow passage closing means comprises a control lever, said control lever being pivotally supported on said valve body, means carried by said control lever and engageable with said slide means, and fluid motor stroke position responsive means associated with said control lever to pivotally move said control lever and actuate said valve spool, said slide means, and said relief spring as a unit to a flow passage closing position.

7. The deceleration valve as defined in claim 6 and having adjustable flow control means associated with said control lever to variably position said valve spool during the stroke of said fluid motor before actuation of said fluid motor stroke position responsive means to control the speed of conveyor mechanism operatively associated with said fluid motor.

References Cited in the file of this patent
UNITED STATES PATENTS
2,902,050     Carls                Sept. 1, 1959